Figure 1:
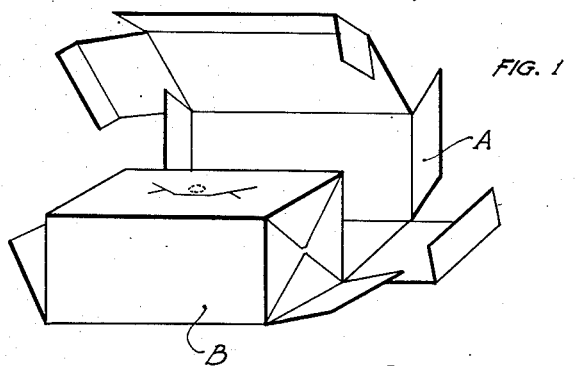

May 2, 1944.  L. PETERS  2,347,640

METHOD AND MEANS OF PACKAGING AND MIXING PLASTICS

Filed Dec. 21, 1940

Inventor:
Leo Peters.
By Dawson, Ooms & Booth
Att'ys.

Patented May 2, 1944

2,347,640

UNITED STATES PATENT OFFICE 2,347,640

METHOD AND MEANS OF PACKAGING AND MIXING PLASTICS

Leo Peters, Chicago, Ill.

Application December 21, 1940, Serial No. 371,085

11 Claims. (Cl. 99—148)

This invention relates to a method and means for packaging and mixing plastics, and more particularly to a method and means for incorporating a material within a plastic mass. For the purpose of clarity, the invention will be described in connection with the packaging of oleomargarine and the mixing of color therewith, a use to which the invention is particularly applicable.

The great bulk of oleomargarine intended for household consumption is sold uncolored and usually in one-pound packages. Coloring at home constitutes a difficult and disagreeable problem for the housewife. The product is wrapped in a greaseproof parchment paper wrapper and then enclosed in a waxed cardboard carton. A small separate package or capsule containing coloring accompanies the package.

In order for a housewife to color oleomargarine purchased in these present-day-packages, it is necessary for her to go through the following operations. She must remove the outer cardboard carton and the inner parchment wrapper. She must then place the oleomargarine in a receptacle of sufficient size to permit her to knead or work the coloring into the oleomargarine. The kneading or mashing is preferably either with the hands or by the use of a fork or spoon. After the color has been thoroughly distributed, the oleomargarine is in a shapeless and difficult-to-handle mass. The housewife must use it by cutting or spooning shapeless portions into her table "butter dish." A substantial amount of the product is lost because of its clinging to the dishes and utensils employed in the coloring operation. If the housewife uses her hands in the mixing operation, these become greasy and tainted with coloring. It is further necessary to wash all the implements and dishes used in the operation. The mixing operation is difficult because only the immediate portion of the oleomargarine in contact with the spoon or fork is modified.

An object of the present invention is to provide a means whereby a plastic material may be worked in its original package and mixed with any desired material in the package. A further object is to provide a package and a method for overcoming the above disadvantages referred to in connection with oleomargarine and the like. Another object is to provide a means for mixing coloring with oleomargarine without employing dishes or implements or requiring that the hands be brought into contact with the oleomargarine. Another object is to provide means for quickly effecting the mixing and coloring operation whereby the force exerted in the kneading operation is spread throughout relatively large masses of the oleomargarine, thus facilitating the mixing and greatly shortening the time required for the coloring operation. Another object is to provide a means and method for introducing the coloring into the oleomargarine and bringing about the coloring of the oleomargarine without at any time opening the sealed package. Yet another object is to provide simple and effective means for restoring the oleomargarine to the desired cake shape without removing it from the wrapper so that it may subsequently be quartered or otherwise served as well as the product in the original package prior to mixing. Other objects and advantages will be set out as the description proceeds and as the various steps of the method and details of the package are set forth.

The invention is illustrated in a preferred embodiment, by the accompanying drawing, in which—

Figure 2:
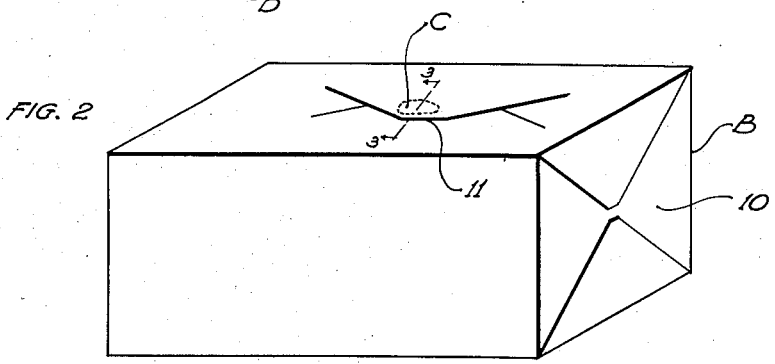
Figure 3:
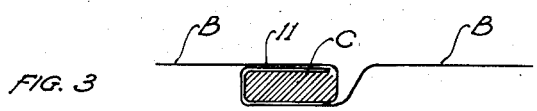

Figure 1 is a perspective view of a package embodying my invention; Fig. 2, a perspective view of the oleomargarine within the wrapper portion of the package embodying my invention; Fig. 3, an enlarged detail sectional view, the section being taken as indicated at line 3 of Fig. 2; and Fig. 4, a perspective view showing the package being kneaded in the color-mixing operation.

In the illustration given, A designates a waxed cardboard carton of the type usually employed for butter and oleomargarine sold in one-pound packages, etc.; B indicates the wrapper employed for the present invention; and C designates the coloring matter employed.

The carton A need not be described in detail since this is old in structure. It may be of any suitable type. For the purpose of the present invention, it is only necessary that the carton be adapted to serve as a container and as a re-molding device for shaping the oleomargarine after the coloring operation, if reshaping is desired.

The wrapper B is preferably formed of a sturdy material which will permit flexing of the wrapper in the kneading of the contents thereof without breaking or tearing. In addition to its sturdy character, I prefer to have it vapor-proof and of a material capable of being firmly sealed. If the material is translucent, this is a further advantage in that it enables the operator to know when the coloring operation is finished. One very satisfactory material is a product known by the trade-mark "Cry-O-Vac," a product formed of latex. A wrapper formed of this material is translucent, resilient, and extremely sturdy. It permits the material within the wrapper to be worked thoroughly without difficulty, the working being effected by kneading, mashing, rolling, or pressing or rubbing the package against a surface. Since the material is resilient, a tight-fitting package may, if desired, be used. I have also found that other materials, such as "Plio-Film" and "Parafilm," etc., may be used. If a non-elastic material is employed, the wrapper will not be as tight-fitting and there will initially be folds which will permit movement of the mass within the wrapper in the mixing operation.

The wrapper may be formed in any desired way. In the particular illustration given, the wrapper B is formed initially in the shape of a bag with the end 10 open to receive the cake of oleomargarine. After the oleomargarine has been introduced into the bag, the end 10 is closed by the folding arrangement shown, the flaps being sealed in airtight relation by the application of heat or by the use of rubber adhesive or by other suitable means. The wrapper is highly vapor-resistant, serving to keep the oleomargarine fresh for long periods, and also preventing loss of weight through evaporation of the moisture.

Any suitable means for supporting the coloring material C in such a manner that it is normally maintained out of contact with the oleomargarine, but upon manipulation may be brought into contact with the oleomargarine, may be employed. Various forms of containers or devices for supporting the coloring material within the package and which may be manipulated without opening the package for bringing the coloring material into contact with the oleomargarine may be used. In the particular illustration given, I provide, as shown more clearly in Fig. 3, a fold 11 within which the coloring material C is supported. The fold is produced as shown more clearly in Figs. 2 and 3. It will be understood that the coloring material may be supported, if desired, within folds at the ends of the package, or supported within breakable envelopes, etc., or by other means, so as to permit the coloring material to be brought into contact with the oleomargarine without breaking the seal of the package.

The carton A, in the illustration given, is provided with the usual sides and ends employed in the packaging of butter and the like. It will be noted that the sides of the carton, together with the ends, provide a mold for reshaping the oleomargarine when the same is soft and is supported within the wrapper B.

In the operation of the invention, the oleomargarine cake is inserted within the bag or envelope B and the free end thereof sealed. If a stretchable or resilient material, such as "Cry-O-Vac," is employed, then the material may be rather close-fitting. If a non-stretchable material is employed, it is preferred to have some loose folds to permit movement of the plastic material within the bag during the mixing operation. The wrapper with contents in a square form is enclosed within the carton A, and in this form is shaped and sold.

Figure 4:
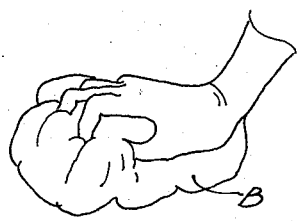

The housewife, when she desires to mix the coloring material with the oleomargarine, first allows the oleomargarine to become plastic or soft by warming. The top wall of the wrapper B is then drawn on each side to eliminate the central fold 11, thus causing the coloring material C to be brought into direct contact with the oleomargarine. The coloring material is then thoroughly mixed with the oleomargarine by kneading the mass, as illustrated in Fig. 4, the material being worked with the fingers and preferably against some surface. Since the material is confined within the wrapper, it is found that the force exerted by the fingers is transmitted over relatively wide areas so that the mixing operation takes place with surprising rapidity, the coloring material being moved readily into all parts of the mass. Since the material is contained within the package, the mass can be handled and worked with great ease. It can be rolled, mashed, and manipulated in a great variety of ways. If the wrapper is translucent, as in the case of the preferred wrapper illustrated, the housewife can determine when the mixing operation is complete and the color is uniformly spread throughout the material. The wrapper B can then be compacted and shaped by the fingers so as to roughly resemble a cake and then placed within the carton A. After the cake is enclosed within the carton, the carton can be thrust against a surface so that each side of the package is compacted. In this way, the oleomargarine is given a square or rectangular shape, approaching the shape in which the material was originally received. The carton thus serves as a mold for bringing the cake back to its original shape. The package may then be placed back in the refrigerator and chilled to form a rather rigid solid cake. When it is desired to use the oleomargarine, the wrapper is for the first time opened and the cake cut into the desired cubes, square slices, etc.

The mixing operation is extremely rapid and the mixing is accomplished without any loss of oleomargarine. No dishes or utensils need be washed, and there is no tendency for the hands of the housewife to be tainted with the coloring. The product is kept for longer periods because of the moisture and vapor-proof seal and because the package is not opened until the oleomargarine is to be used. The product is not only kept fresh, but loses substantially nothing in weight, even though considerable time elapses between packaging and final consumption. The package enables the housewife, after the mixing operation, to serve the oleomargarine in a more attractive manner. Instead of a shapeless mass lying in a dish, the oleomargarine is restored quickly to its original shape in the cardboard carton and can be cut and served in a neat and definite shape that looks attractive on the table.

While the coloring material has been described as being within the package from the beginning, it will be understood that, if desired, the package may be opened for introduction of the coloring material and the package again sealed or held in closed position during the coloring mixing operation. Further, while the invention has been described in connection with oleomargarine as an illustration, it will be understood that it is also applicable to other plastic materials. The details of description and the specific steps recited are set forth for the purpose of clearly illustrating one mode of use of the invention and it will be obvious that such details and steps may be varied widely by those skilled in the art without departing from the spirit of my invention.

I claim:

1. In a method for mixing coloring material with oleomargarine, the steps of enclosing the oleomargarine and coloring material within a translucent flexible container, said oleomargarine and said material being spaced apart within said container, sealing the container to form an airtight enclosure and while keeping the container closed, manipulating the container and contents to mix the coloring material uniformly with the oleomargarine.

2. In a method for mixing coloring material with oleomargarine, the steps of introducing the coloring material and oleomargarine within a package and sealing the same in air-tight closed condition, said oleomargarine and said material being spaced apart by a portion of said package, and then manipulating the package and the contents while in sealed condition to thoroughly mix the contents.

3. In a method for mixing coloring material with oleomargarine, the steps of packaging oleomargarine within a flexible container sufficiently strong to withstand kneading, introducing coloring material, also within the package but held spaced from said oleomargarine, sealing the package, manipulating the package with a kneading movement to bring the coloring material into contact with the oleomargarine and to thoroughly mix the coloring material with the oleomargarine.

4. In a process of the character set forth for mixing coloring material with oleomargarine, the steps of introducing coloring material and oleomargarine into a flexible container having walls sufficiently strong to withstand kneading, said oleomargarine and said coloring material being spaced apart within said container sealing the container to form an air-tight enclosure, kneading the container and the contents to thoroughly mix the coloring material with the oleomargarine, reshaping the package, and chilling the same.

5. In a process of the character set forth for mixing coloring material with oleomargarine, the steps of introducing coloring material and oleomargarine into a flexible container having walls sufficiently strong to withstand kneading, said oleomargarine and said coloring material being spaced apart within said container by a portion of the container sealing the container to form an air-tight enclosure, kneading the container and the contents to thoroughly mix the coloring material with the oleomargarine, introducing the container within a molded carton to shape the same, and chilling.

6. In a method of the character set forth for mixing coloring material with oleomargarine, the steps of placing the oleomargarine within a wrapper provided with folds, introducing coloring material within the folds and spaced from the oleomargarine, sealing the wrapper to form an air-tight enclosure, and subsequently drawing the wrapper wall to remove the fold and bring the coloring material into contact with the oleomargarine, and kneading the contents within the wrapper to mix the same.

7. In a process of the character set forth for mixing coloring material with oleomargarine the steps of introducing oleomargine into a flexible translucent thermoplastic wrapper of a material sufficiently strong to withstand kneading, providing in the surface of the wrapper an inward fold forming a compartment within the wrapper and disposed immediately beneath the outer surface of the same, introducing coloring material into said compartment, the coloring material being separated from the oleomargarine by the folds in the wrapper, heat-sealing the wrapper to form an air-tight enclosure for the oleomargarine and coloring material therein, and manipulating the wrapper with a kneading movement to bring the coloring material into contact with the oleomargarine and to thoroughly mix the same.

8. A method of mixing coloring material with oleomargarine comprising introducing the oleomargarine into a flexible translucent thermoplastic wrapper of a material sufficiently strong to withstand kneading, the wrapper being in the form of a container, inwardly folding the outer surface of the wrapper to form a compartment disposed immediately within said outer with the outer surface of the wrapper remaining substantially smooth and regular, introducing coloring material into said compartment, the coloring material being separated from the oleomargarine by the folds in the wrapper, heat-sealing the wrapper to form an air-tight enclosure for the oleomargarine and coloring material, manipulating the flexible wrapper to eliminate the folds therein and bring the coloring material into contact with the oleomargarine, and kneading the wrapper and the oleomargarine and coloring material therein to thoroughly mix the coloring material with the oleomargarine.

9. A package for the purpose set forth comprising a container having flexible and sturdy walls, a body of oleomargarine within the container, the walls of the container being folded to provide therein a compartment spaced from said oleomargarine, coloring material within said compartment, said container being sealed to provide an air-tight enclosure receiving said oleomargarine and said coloring material, the walls of the container being manipulatable to bring the coloring material into contact with the oleomargarine.

10. A package for the purpose set forth comprising a wrapper having strong and flexible walls of a thermoplastic translucent material, a body of oleomargarine within the wrapper, the walls of the wrapper being folded inwardly to provide therein a compartment spaced from said oleomargarine, coloring material within said compartment separated from said oleomargarine by the folds in the wrapper, the walls of the wrapper being heat-sealed to provide an air-tight enclosure for the coloring material and oleomargarine and being manipulatable to eliminate the folds in said wrapper and to bring the coloring material into contact with said oleomargarine.

11. A package of the character set forth comprising a wrapper of translucent thermoplastic flexible material sufficiently strong to withstand kneading, said wrapper being heat-sealed to form an air-tight enclosure, a cake of oleomargarine within the enclosure, folds in the outer surface of the wrapper extending inwardly therefrom to provide a compartment immediately beneath said outer surface, the compartment being separated from the oleomargarine by said folds and the outer surface of the wrapper being substantially smooth and regular, coloring material in said compartment, each portion of said wrapper being freely movable with respect to the other portions thereof whereby the folds in the wrapper may be eliminated by manipulating the wrapper and the coloring material brought into contact and mixed with the oleomargarine by kneading the wrapper and the material therein.

LEO PETERS.